(12) United States Patent
Muramatsu

(10) Patent No.: US 12,722,654 B2
(45) Date of Patent: Sep. 1, 2026

(54) AUTONOMOUS DRIVING SYSTEM, PATH PLAN GENERATION METHOD, AND STORAGE MEDIUM

(71) Applicant: TOYOTA JIDOSHA KABUSHIKI KAISHA, Toyota (JP)

(72) Inventor: Naoyuki Muramatsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 17/890,807

(22) Filed: Aug. 18, 2022

(65) Prior Publication Data

US 2023/0061405 A1 Mar. 2, 2023

(30) Foreign Application Priority Data

Sep. 1, 2021 (JP) ................................ 2021-142693

(51) Int. Cl.
*B60W 60/00* (2020.01)
*B60W 30/18* (2012.01)

(52) U.S. Cl.
CPC .... *B60W 60/001* (2020.02); *B60W 30/18163* (2013.01); *B60W 2552/10* (2020.02); *B60W 2554/4041* (2020.02)

(58) Field of Classification Search
CPC ......... B60W 60/001; B60W 30/18163; B60W 2552/10; B60W 2554/4041; B60W 2754/20; B60W 2554/4042; B60W 2554/801
See application file for complete search history.

(56) References Cited

U.S. PATENT DOCUMENTS

2005/0228588 A1 10/2005 Braeuchle et al.
2014/0188345 A1 7/2014 Tamura et al.
2016/0221604 A1 8/2016 Yamaoka
(Continued)

FOREIGN PATENT DOCUMENTS

CN 113034971 A 6/2021
JP 2005-524135 A 8/2005
(Continued)

OTHER PUBLICATIONS

Machine translated description of cited reference JP2006321299. (Year: 2006).*
(Continued)

*Primary Examiner* — Navid Z. Mehdizadeh
*Assistant Examiner* — Shelley Marie Osterhout
(74) *Attorney, Agent, or Firm* — Dinsmore & Shohl LLP

(57) ABSTRACT

An autonomous driving system according to the present disclosure is an autonomous driving system that causes a vehicle to autonomously travel along a path plan, and includes a memory and a processor. The processor is configured to execute a determination process of determining whether offset processing is necessary, the offset processing offsetting the path plan in a lane width direction with respect to a reference traveling position in a changed lane after a lane change when the lane change is performed in response to that a preceding vehicle is present, and a process of generating the path plan related to the lane change so as to connect to the path plan that is offset in the changed lane after the lane change when the offset processing is necessary.

8 Claims, 7 Drawing Sheets

(56) References Cited

U.S. PATENT DOCUMENTS

| | | | | |
|---|---|---|---|---|
| 2016/0313133 | A1* | 10/2016 | Zeng | B60W 60/0011 |
| 2019/0283757 | A1* | 9/2019 | Honda | G05D 1/0088 |
| 2021/0309219 | A1* | 10/2021 | Newman | G05D 1/0214 |
| 2023/0009173 | A1* | 1/2023 | Reshef | B60W 30/18163 |
| 2023/0406316 | A1* | 12/2023 | Kume | B60W 30/18163 |

FOREIGN PATENT DOCUMENTS

| | | | | |
|---|---|---|---|---|
| JP | 3740902 | B2 | | 2/2006 |
| JP | 2006321299 | A | * | 11/2006 |
| JP | 5743286 | B2 | | 7/2015 |
| JP | 2016-139369 | A | | 8/2016 |
| JP | 2017073060 | A | * | 4/2017 |
| JP | 2017136968 | A | * | 8/2017 |

OTHER PUBLICATIONS

Machine translated description of cited reference JP2017136968. (Year: 2017).*

EPO machine translated description of foreign reference JP2017073060A (Year: 2017).*

* cited by examiner

AUTONOMOUS TRAVELING CONTROL DEVICE
MEMORY
DRIVING ENVIRONMENT INFORMATION
PROGRAM
PROCESSOR
ACTUATORS
CONTROL SIGNAL
SENSORS
ECUS
COMMUNICATION DEVICE
HMI DEVICE
DETECTION INFORMATION
CONTROL INFORMATION
COMMUNICATION INFORMATION
HMI INFORMATION
10
100
110
111
112
120
200
300
400
500
600

DRIVING ENVIRONMENT INFORMATION
121
SELF-POSITION ESTIMATION PROCESSING UNIT
122
TRAVELING ENVIRONMENT RECOGNITION PROCESSING UNIT
SELF-POSITION ESTIMATION RESULT
TRAVELING ENVIRONMENT RECOGNITION RESULT
123
PATH PLAN GENERATION PROCESSING UNIT
PATH PLAN
124
CONTROL SIGNAL GENERATION PROCESSING UNIT
CONTROL SIGNAL

FIG. 7

AUTONOMOUS DRIVING SYSTEM, PATH PLAN GENERATION METHOD, AND STORAGE MEDIUM

CROSS-REFERENCE TO RELATED APPLICATION

This application claims priority to Japanese Patent Application No. 2021-142693 filed on Sep. 1, 2021, incorporated herein by reference in its entirety.

BACKGROUND

1. Technical Field

The present disclosure relates to an autonomous driving system that causes a vehicle to autonomously travel along a path plan, a path plan generation method that generates a path plan related to autonomous driving of the vehicle, and a storage medium storing a program that causes a computer to execute the path plan generation method.

2. Description of Related Art

In the related art, in an autonomous driving system that causes a vehicle to autonomously travel along a path plan, when a vehicle traveling in an adjacent lane is a large-sized vehicle such as a truck, travels near the traveling lane of a host vehicle, travels to approach the host vehicle, or the like, it is considered that the path plan is offset in a lane width direction with respect to a reference traveling position. With the configuration above, it is possible to reduce the feeling of oppression and anxiety received from the vehicle traveling in the adjacent lane. As the related art for offsetting the path plan in the lane width direction with respect to the reference traveling position, for example, Japanese Unexamined Patent Application Publication No. 2016-139369 (JP 2016-139369 A) can be mentioned.

SUMMARY

A process of offsetting the path plan in the lane width direction with respect to the reference traveling position (hereinafter, also referred to as "offset processing") is executed sufficiently before the host vehicle travels beside another vehicle traveling in the adjacent lane (hereinafter, also simply referred to as "another vehicle").

However, when the lane change of the vehicle is performed with the preceding vehicle being present, it is assumed that the host vehicle travels beside the other vehicle that has been the preceding vehicle immediately after the lane change. In this case, there is a possibility that, when the host vehicle overtakes the other vehicle immediately after the lane change, the offset processing is not executed, and the feeling of oppression and anxiety received from the other vehicle cannot be reduced. Further, there is a possibility that, when the offset processing is executed after the lane change, the path plan becomes complicated and the comfort is impaired because there is not enough time to spare.

The present disclosure has been made in view of the above issue, and it is an object of the present disclosure to provide an autonomous driving system, a path plan generation method, and a storage medium storing a program that causes a computer to execute the path plan generation method capable of reducing the feeling of oppression and anxiety received from the other vehicle in the changed lane after the lane change of the vehicle even when the lane change is performed.

A first disclosure relates to an autonomous driving system that causes a vehicle to autonomously travel along a path plan.

The autonomous driving system includes: at least one memory that stores driving environment information of the vehicle; and at least one processor coupled with the at least one memory. The processor is configured to execute, based on the driving environment information, a determination process of determining whether offset processing is necessary, the offset processing offsetting the path plan in a lane width direction with respect to a reference traveling position in a changed lane after a lane change when the lane change is performed in response to that a preceding vehicle is present, and a process of generating the path plan related to the lane change so as to connect to the path plan that is offset in the changed lane after the lane change when the offset processing is necessary.

A second disclosure further has the following features with respect to the autonomous driving system according to the first disclosure.

The processor determines that, in the determination process, the offset processing is necessary when a size of the preceding vehicle is equal to or greater than a predetermined value.

A third disclosure further has the following features with respect to the autonomous driving system according to the first or the second disclosure.

The processor determines that, in the determination process, the offset processing is necessary when the preceding vehicle travels to approach or near the changed lane after the lane change.

A fourth disclosure further has the following features with respect to the autonomous driving system according to the second or the third disclosure.

The processor determines that, in the determination process, the offset processing is necessary further on condition that the vehicle overtakes the preceding vehicle in the changed lane after the lane change.

A fifth disclosure relates to a path plan generation method that generates a path plan related to autonomous driving of a vehicle.

The path plan generation method includes: a determination process of determining whether offset processing is necessary, the offset processing offsetting the path plan in a lane width direction with respect to a reference traveling position in a changed lane after a lane change when the lane change of the vehicle is performed in response to that a preceding vehicle is present; and a process of generating the path plan related to the lane change so as to connect to the path plan that is offset in the changed lane after the lane change.

A sixth disclosure further has the following features with respect to the path plan generation method according to the fifth disclosure.

In the determination process, a size of the preceding vehicle is acquired or calculated, and the offset processing is determined to be necessary when the size is equal to or greater than a predetermined value.

A seventh disclosure further has the following features with respect to the path plan generation method according to the fifth or the sixth disclosure.

In the determination process, the offset processing is determined to be necessary when the preceding vehicle travels to approach or near the changed lane after the lane change.

An eighth disclosure further has the following features with respect to the path plan generation method according to the sixth or the seventh disclosure.

In the determination process, the offset processing is determined to be necessary further on condition that the vehicle overtakes the preceding vehicle in the changed lane after the lane change.

A ninth disclosure relates to a storage medium storing a program that causes a computer to execute the path plan generation method according to any one of the fifth to the eighth disclosures.

According to the autonomous driving system, the path plan generation method, and the storage medium storing the program that causes the computer to execute the path plan generation method according to the present disclosure, when the lane change is performed in response to that the preceding vehicle is present, first, the path plan in the changed lane after the lane change is offset in the lane width direction with respect to the reference traveling position. Then, the path plan related to the lane change is generated so as to connect to the offset path plan in the changed lane after the lane change. With the above, even when the lane change is performed, the offset processing is appropriately executed, and the feeling of oppression and anxiety received from the other vehicle that has been the preceding vehicle traveling in the adjacent lane can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing a path plan generation method when the lane change is performed in the autonomous driving system according to the present embodiment.

DETAILED DESCRIPTION OF EMBODIMENTS

Hereinafter, embodiments of the present disclosure will be described with reference to the drawings. However, when the number, quantity, amount, range, etc., of each element are referred to in the embodiments shown below, the idea of the present disclosure is not limited to the numbers mentioned herein except when explicitly stated or when clearly specified by the number in principle. In addition, the configurations and the like described in the embodiments shown below are not necessarily essential to the idea of the present disclosure, except when explicitly stated or when clearly specified in principle. In each figure, the same or corresponding parts are designated by the same reference signs, and duplicated description thereof will be appropriately simplified or omitted.

1. Outline

Figure 1:
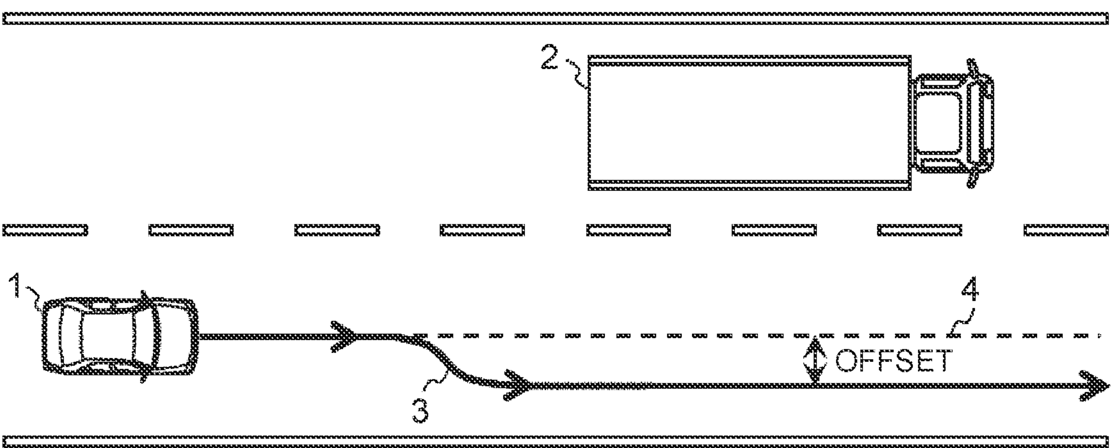
FIG. 1 is a conceptual diagram for explaining offset processing.

In the related art, in an autonomous driving system that causes a vehicle to autonomously travel along a path plan, a process of offsetting (offset processing) the pass plan in the lane width direction with respect to a reference traveling position has been considered. FIG. 1 is a conceptual diagram for explaining the offset processing. FIG. 1 shows an example of a path plan 3 (thick arrow) when a host vehicle 1 that autonomously travels is going to overtake another vehicle 2 traveling in an adjacent lane.

The offset processing is executed when the other vehicle 2 is a large-sized vehicle such as a truck, travels near the traveling lane of the host vehicle 1, travels to approach the host vehicle 1, and the like. When the offset processing is executed, as shown in FIG. 1, the path plan 3 is offset in the lane width direction with respect to a reference traveling position 4. Here, the reference traveling position 4 is typically the central position of the lane in which the host vehicle 1 travels.

When the offset processing is executed, the host vehicle 1 that autonomously travels along the path plan 3 can travel beside the other vehicle 2 at a distance from the other vehicle 2. This makes it possible to reduce the feeling of oppression and anxiety received from the other vehicle 2.

In the related art, the offset processing is executed with respect to the other vehicle 2 traveling in the adjacent lane. Therefore, when the host vehicle 1 performs the lane change, whether the offset processing in the changed lane after the lane change is necessary is determined after the lane change is performed. Therefore, there is a possibility that, when the host vehicle 1 performs a lane change with a preceding vehicle being present, the offset processing is not appropriately executed.

Figure 2A:
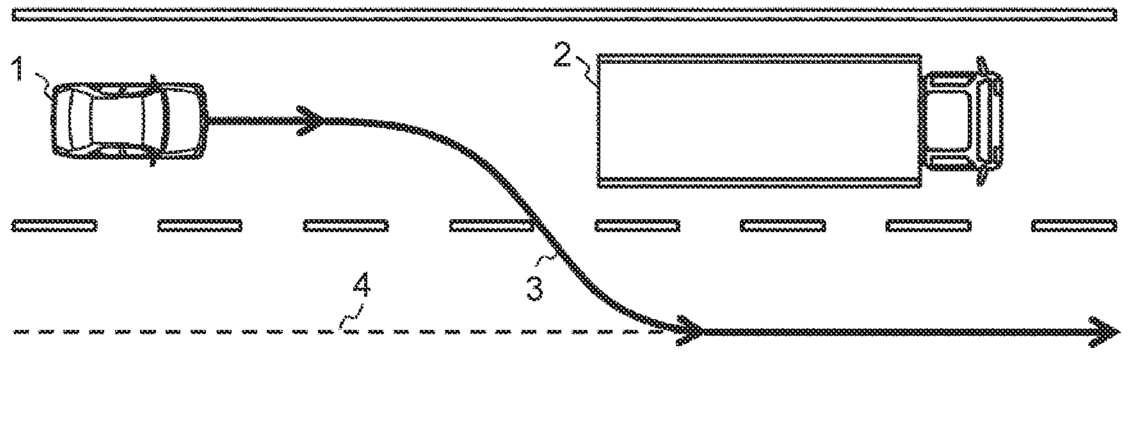
FIG. 2A is a conceptual diagram for explaining the offset processing when a host vehicle that autonomously travels performs a lane change.
Figure 2B:
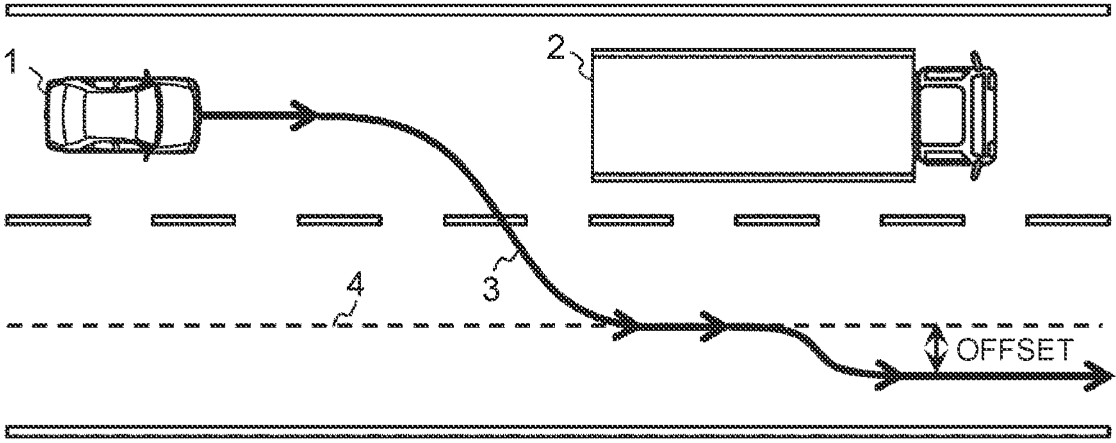
FIG. 2B is a conceptual diagram for explaining the offset processing when the host vehicle that autonomously travels performs the lane change.

FIGS. 2A and 2B are conceptual diagrams for explaining the offset processing when the host vehicle 1 that autonomously travels performs the lane change with the preceding vehicle being present. FIGS. 2A and 2B show examples of the path plan 3 in which the host vehicle 1 that autonomously travels changes the lane and attempts to overtake the other vehicle 2 that is the preceding vehicle. Here, it is assumed that the other vehicle 2 is, for example, a large-sized vehicle and is the target for which the offset processing is executed.

FIG. 2A shows an example of the path plan 3 when the host vehicle 1 changes lane and then immediately overtakes the other vehicle 2 that has been the preceding vehicle without executing the offset processing. This is a case where, for example, the determination on whether the offset processing is necessary or the start of execution is not in time. At this time, the host vehicle 1 travels beside the other vehicle 2 without taking a distance from the other vehicle 2. This cannot achieve reduction of the feeling of oppression and anxiety received from the other vehicle 2.

FIG. 2B shows an example of the path plan 3 when the offset processing is executed after the host vehicle 1 changes lane. At this time, as shown in FIG. 2B, the path plan 3 may become complicated and the comfort may be impaired. Further, there may be a case where, for a while after the lane change, the host vehicle 1 travels beside the other vehicle 2 without taking a distance from the other vehicle 2. In this case, the feeling of oppression and anxiety received from the other vehicle 2 cannot be reduced for a while.

Therefore, in the autonomous driving system according to the present embodiment, when the lane change is performed with the preceding vehicle being present, whether the offset processing is necessary in the changed lane after the lane change is determined. Then, when the offset processing is necessary in the changed lane after the lane change, the path plan 3 that is offset in the lane width direction with respect to the reference traveling position 4 in the changed lane after the lane change is generated, and the path plan 3 is generated such that the path plan 3 connects to the offset path plan 3 in the changed lane after the lane change.

Figure 3:
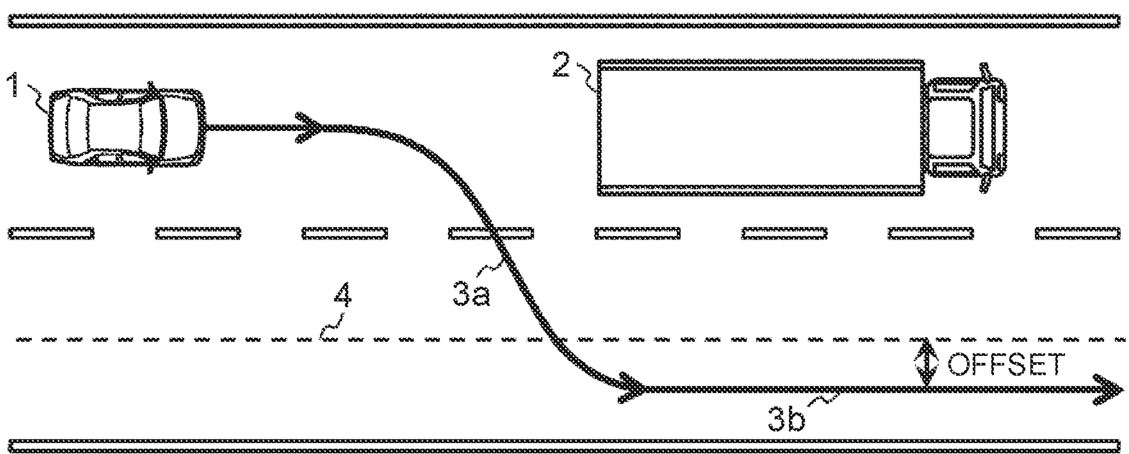
FIG. 3 is a conceptual diagram for explaining a path plan generated in an autonomous driving system according to the present embodiment.

FIG. 3 is a conceptual diagram for explaining the path plan 3 generated in the autonomous driving system according to the present embodiment. Similar to FIGS. 2A and 2B, FIG. 3 shows an example of the path plan 3 in which the host vehicle 1 that autonomously travels changes lane and attempts to overtake the other vehicle 2 that is the preceding vehicle. Note that FIG. 3 partially distinguishes between the path plan 3 (path plan 3*a*) related to the lane change and the path plan 3 (path plan 3*b*) in the changed lane after the lane change.

In FIG. 3, in the autonomous driving system according to the present embodiment, whether the offset processing is necessary in the changed lane after the lane change is determined. For example, the offset processing is determined to be necessary when the preceding vehicle (other vehicle 2) is a large-sized vehicle, or when the preceding vehicle (other vehicle 2) travels to approach or near the changed lane after the lane change. Then, when the offset processing is determined to be necessary, as shown in FIG. 3, the path plan 3*a* related to the lane change is generated so as to connect to the offset path plan 3*b*.

With the above, even when the host vehicle 1 performs the lane change, the offset processing is appropriately executed, and the feeling of oppression and anxiety received from the other vehicle 2 traveling in the adjacent lane can be reduced. Hereinafter, the autonomous driving system according to the present embodiment will be described in more detail.

2. Autonomous Driving System

Figure 4:
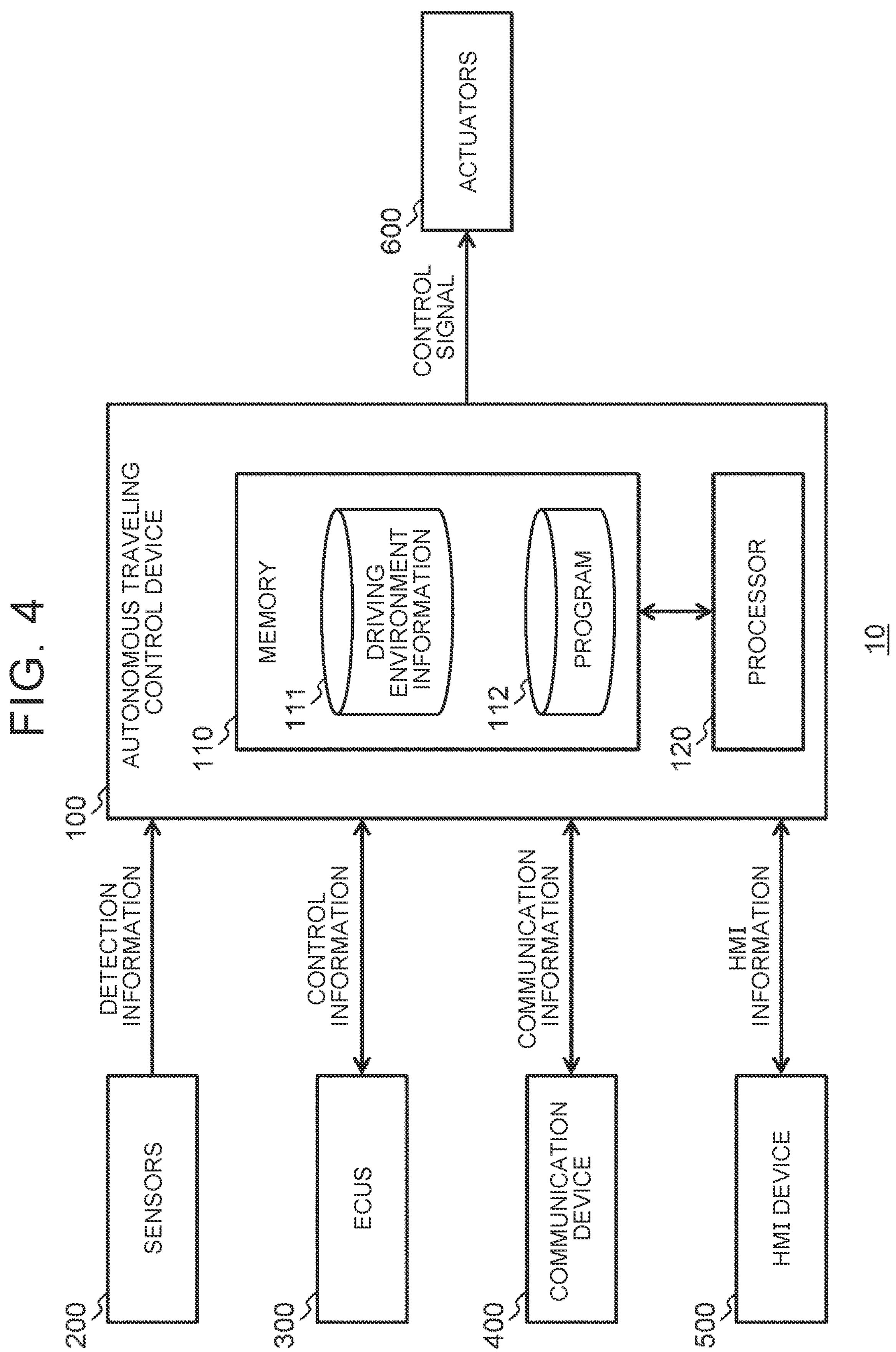
FIG. 4 is a block diagram showing a configuration of the autonomous driving system according to the present embodiment.

FIG. 4 is a block diagram showing a configuration of the autonomous driving system 10 according to the present embodiment. The autonomous driving system 10 provides a function of causing the host vehicle 1 to autonomously travel along the path plan 3. The autonomous driving system 10 includes an autonomous traveling control device 100, sensors 200, electronic control units (ECUs) 300, a communication device 400, a human machine interface (HMI) device 500, and actuators 600.

The autonomous traveling control device 100 is configured to be able to transmit information to each other with the sensors 200, the ECUs 300, the communication device 400, the HMI device 500, and the actuators 600. Typically, the above components are electrically connected by a wire harness. However, the connection may be configured by other methods. For example, the components in the autonomous traveling control device 100 may be connected to each other wirelessly or via optical communication line.

The sensors 200 are sensors that detect information related to a driving environment of the host vehicle 1 and output the detected information (detection information). The sensors 200 typically include a sensor that detects a traveling state of the host vehicle 1 (vehicle speed, acceleration, yaw rate, etc.) and a sensor that detects information on a surrounding environment of the host vehicle 1 (preceding vehicles rear vehicles, lanes, obstacles, etc.).

Examples of the sensor that detects the traveling state of the host vehicle 1 include, for example, a wheel speed sensor that detects the vehicle speed of the host vehicle 1, an acceleration sensor that detects the acceleration of the host vehicle 1, a gyro sensor that detects an angular velocity of the host vehicle 1, and the like. Further, examples of the sensor that detects the surrounding environment of the host vehicle 1 include, for example, a sensor camera, light detection and ranging (LIDAR), a millimeter wave radar, a short range radar (SRR), and the like.

Figure 5:
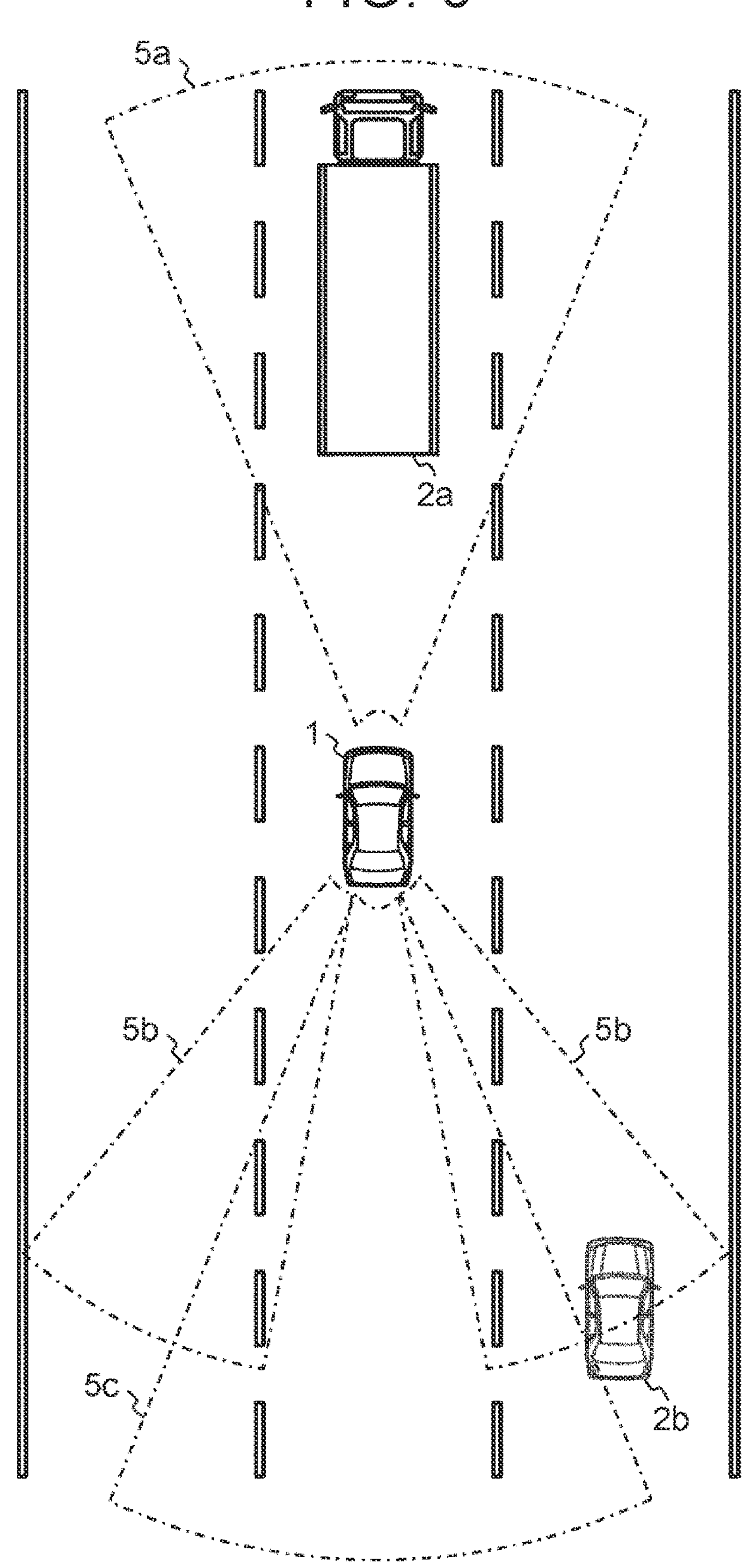
FIG. 5 is a conceptual diagram for explaining the sensor that detects information on surrounding environment of the host vehicle.

In particular, the sensor that detects the information on the surrounding environment of the host vehicle 1 detects the traveling state and position information of the preceding vehicle traveling in front of the host vehicle 1 and the rear vehicle traveling behind the host vehicle 1. FIG. 5 is a conceptual diagram for explaining the sensor that detects information on the surrounding environment of the host vehicle 1. As shown in FIG. 5, the traveling state and the position of a preceding vehicle 2*a* are specified by a detection 5*a* in front of the host vehicle 1 (for example, detection by a sensor camera, LIDAR, and millimeter wave radar). Further, the traveling state and the position of a rear vehicle 2*b* are specified by a detection 5*b* on the rear lateral side of the host vehicle 1 and a detection 5*c* at the rear of the vehicle 1 (for example, detection by a sensor camera, LIDAR, and SRR).

The detection information output by the sensors 200 may include, in addition to information that is directly detected by the sensors, information acquired by arithmetic processing based on the directly detected information. For example, the sensor camera may output information such as the width, height, color, and type of the preceding vehicle as the detection information from the detected image information by arithmetic processing. In this case, the arithmetic processing may be executed in each sensor, or the sensors 200 may include a device that executes the arithmetic processing.

FIG. 4 is referred again. The detection information output by the sensors 200 is transmitted to the autonomous traveling control device 100 to the extent necessary as driving environment information 111.

The ECUs 300 are a type of ECU (electronic control unit) that executes a process related to the control of the host vehicle 1. Examples of the ECUs included in the ECUs 300 include, for example, an ECU for controlling a power unit (internal combustion engine, electric motor, or a hybrid engine thereof, etc.), an ECU for controlling a brake, an ECU for controlling a transmission, and the like. The ECUs 300 output information (control information) such as a processing execution result. The control information output by the ECUs 300 is transmitted to the autonomous traveling control device 100 to the extent necessary as the driving environment information 111. The control information transmitted to the autonomous traveling control device 100 is, for example, a control state of the power device, a control state of the brake, and the like.

The communication device 400 is a device that transmits and receives various types of information (communication information) by communicating with a device outside the host vehicle 1. Examples of the communication device 400 include a device that performs vehicle-to-vehicle communication and road-to-vehicle communication, a global positioning system (GPS) receiver, a device that connects to the Internet and communicates with a server on the Internet, and the like. The control information received by the communication device 400 is transmitted to the autonomous traveling control device 100 to the extent necessary as the driving environment information 111. The communication information transmitted to the autonomous traveling control device 100 is, for example, map information, traffic information on the road on which the host vehicle 1 travels, and the like.

The HMI device 500 is a device that provides an HMI function. Examples of the HMI device 500 include switches, indicators, speakers, touch panels, car navigation devices, and the like, or combinations thereof. Information related to the HMI function (HMI information) such as operation information and setting information output by the HMI device 500 is transmitted to the autonomous traveling control device 100 to the extent necessary as the driving environment information 111. The HMI information transmitted to the autonomous traveling control device 100 is, for example, on and off information of each function included in the host vehicle 1, information on the destination, and the like.

The autonomous traveling control device 100 executes a process related to autonomous traveling control of the host vehicle 1 based on the driving environment information 111, and generates and outputs a control signal related to the autonomous traveling control. The control signal output by the autonomous traveling control device 100 is transmitted to the actuators 600. Alternatively, the control signal may be transmitted to the actuators 600 via the ECUs 300.

The autonomous traveling control device 100 includes a memory 110 and a processor 120. The processor 120 is coupled to the memory 110. The autonomous traveling control device 100 is typically one of the ECUs. However, the autonomous traveling control device 100 may be a server configured on a communication network (typically, the Internet). In this case, the autonomous traveling control device 100 acquires information and transmits a control signal by communication via the communication network.

The memory 110 typically includes a random access memory (RAM) for temporarily storing data and a read-only memory (ROM) for storing a program 112 that can be executed by the processor 120 and various data related to the program 112. The memory 110 stores the driving environment information 111 acquired by the autonomous traveling control device 100. The program is stored in a storage medium.

The processor 120 reads the program 112 from the memory 110, and executes a process in accordance with the program 112 based on various data read from the memory 110. The process executed by the processor 120 in accordance with the program 112 will be described later.

Note that, the autonomous traveling control device 100 may include a plurality of the memories 110 and a plurality of the processors 120. In this case, each memory 110 and each processor 120 cooperate to execute the process related to the autonomous traveling control. Further, the autonomous traveling control device 100 may be a system composed of a plurality of computers. In this case, the respective computers cooperate to each other to execute the process related to the autonomous traveling control.

The actuators 600 are types of actuators that operate in accordance with a control signal. Operations of the various actuators included in the actuators 600 in accordance with the control signal transmitted from the autonomous traveling control device 100 realizes the autonomous traveling control of the host vehicle 1 executed by the autonomous traveling control device 100.

Examples of the actuators 600 include an actuator for driving a power device, an actuator for driving a brake mechanism of the host vehicle 1, an actuator for driving a steering mechanism of the host vehicle 1, and the like.

3. Autonomous Traveling Control

Figure 6:
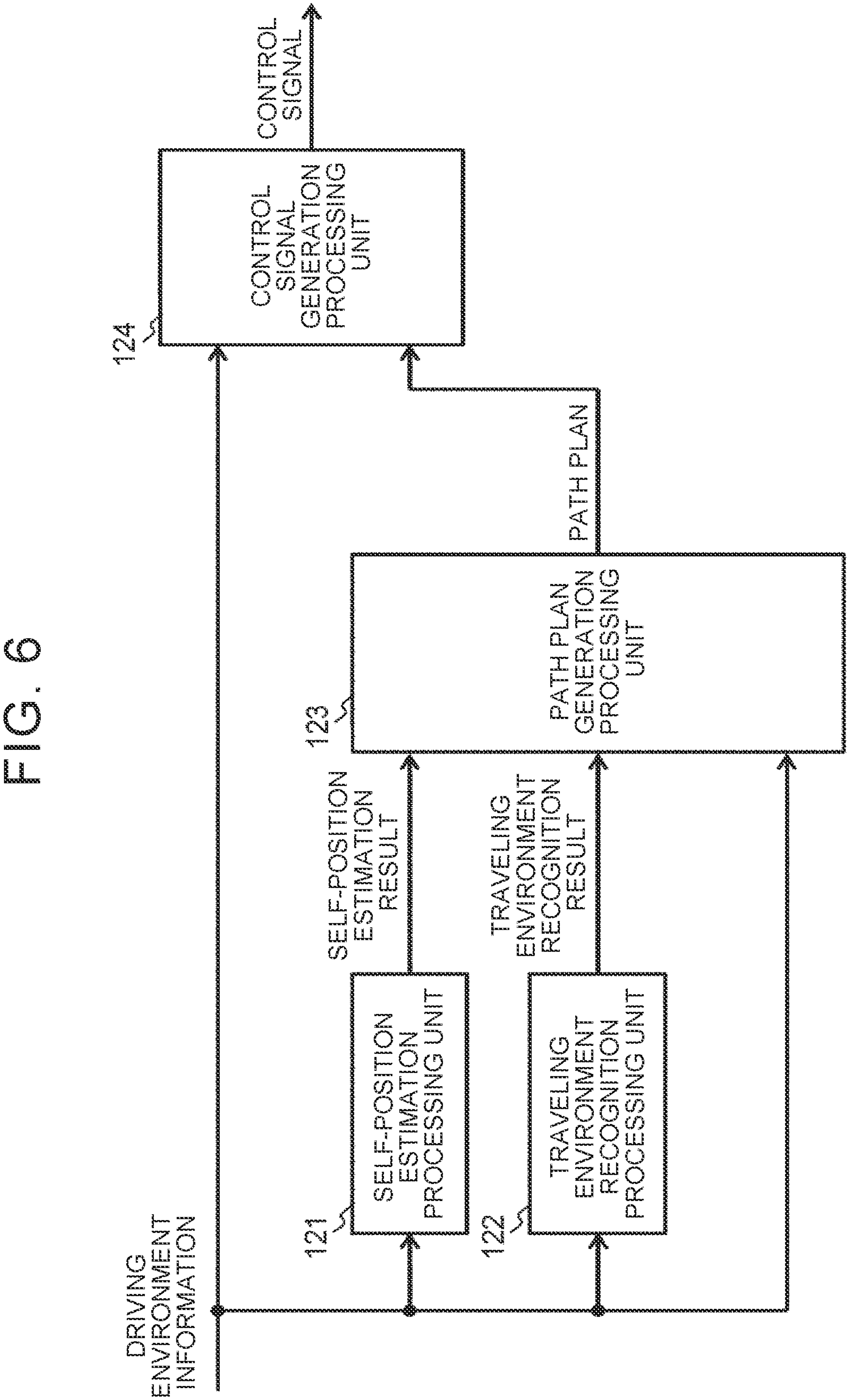
FIG. 6 is a block diagram showing a configuration of a process executed by a processor shown in FIG. 4 in accordance with a program.

Hereinafter, the process executed by the processor 120 of the autonomous traveling control device 100 in accordance with the program 112 will be described. FIG. 6 is a block diagram showing a configuration of the process executed by the processor 120 in accordance with the program 112.

The process executed by the processor 120 in accordance with the program 112 is configured of a self-position estimation processing unit 121, a traveling environment recognition processing unit 122, a path plan generation processing unit 123, and a control signal generation processing unit 124. The units may be realized as a part of the program 112, or may be realized by each of multiple computers consisting the autonomous traveling control device 100.

The self-position estimation processing unit 121 executes self-position estimation of the host vehicle 1 based on the driving environment information 111. For example, the position of the host vehicle 1 on the map is estimated from the relative distance between the map information and a surrounding target and a past self-position estimation result. However, as the method of self-position estimation, an appropriate known technique may be adopted. The self-position estimation result is transmitted to the path plan generation processing unit 123.

The traveling environment recognition processing unit 122 executes traveling environment recognition of the host vehicle 1 based on the driving environment information 111. The traveling environment recognition includes recognition of surrounding vehicles, recognition of white road lines, and the like. For example, the traveling environment recognition processing unit 122 specifies the size, position, type, and the like of the preceding vehicle. However, as the method of traveling environment recognition, an appropriate known technique may be adopted. The traveling environment recognition result is transmitted to the path plan generation processing unit 123.

The path plan generation processing unit 123 generates the path plan 3 based on the driving environment information 111, the self-position estimation result, and the traveling environment recognition result. The path plan generation processing unit 123 determines whether to perform the lane change and whether to execute the offset processing for generating the path plan 3. The autonomous driving system 10 according to the present embodiment is characterized by a method for generating the path plan 3 (path plan generation method) that is a process executed by the path plan generation processing unit 123 and is the generation method when the lane change is performed. The details of the path plan generation method when the lane change is performed will be described later.

The control signal generation processing unit 124 generates a control signal such that the host vehicle 1 travels in accordance with the path plan 3 based on the driving environment information and the path plan 3. Typically, the control amount (accelerator operation amount, brake fluid pressure, steering angle, etc.) related to acceleration, braking, and steering is calculated from the current traveling state of the host vehicle 1 so as to be in line with the path plan 3. However, as the method of generating the control signal, an appropriate known technique may be adopted.

4. Path Plan Generation Method

Figure 7:
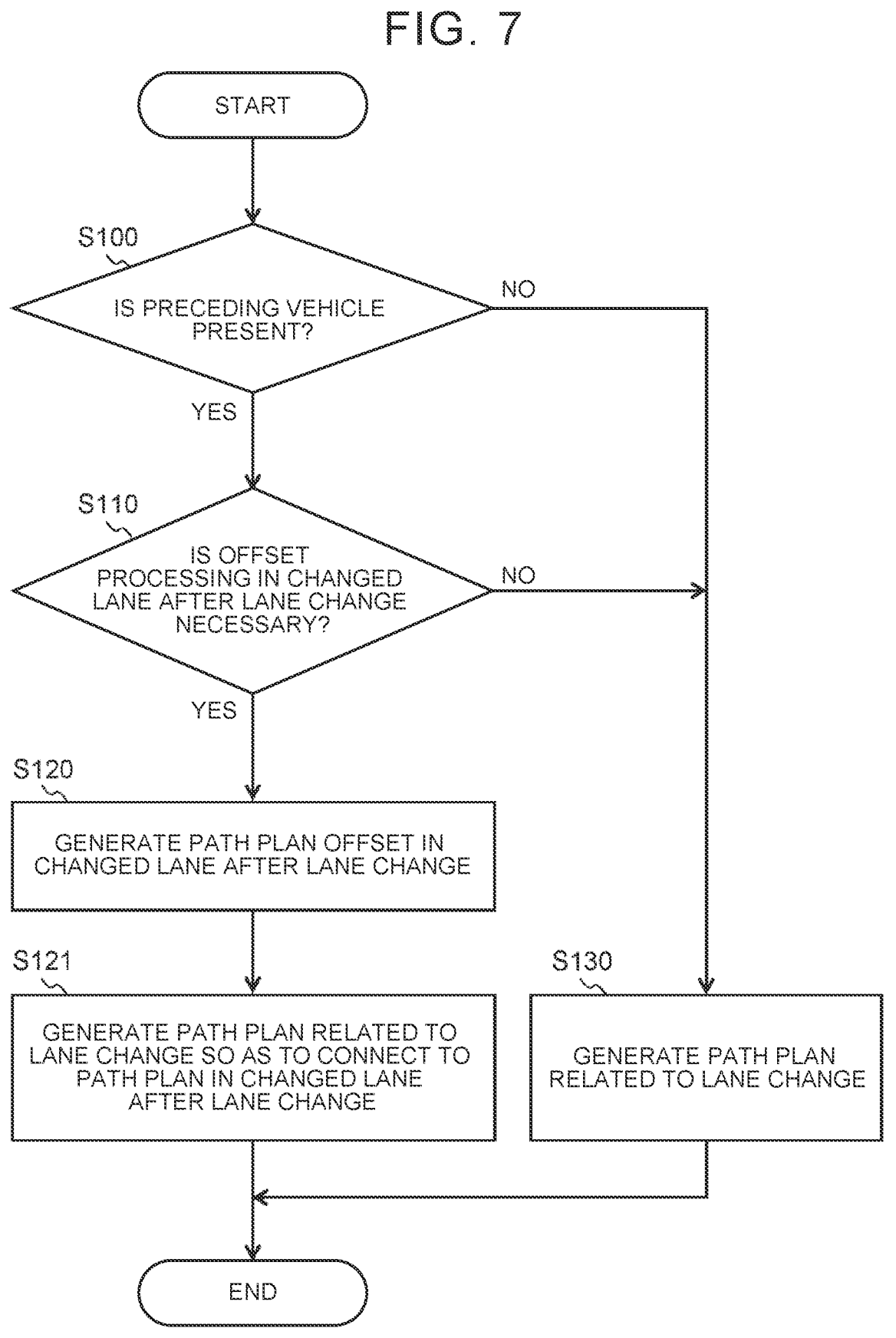

The details of the path plan generation method when the lane change is performed will be described later. FIG. 7 is a flowchart showing the path plan generation method when the lane change is performed. The process shown in FIG. 7 is executed by the path plan generation processing unit 123, and starts when the path plan generation processing unit 123 determines that the lane change is performed.

Here, the path plan generation processing unit 123 determines that the lane change is performed when, for example, the host vehicle 1 overtakes the preceding vehicle, when there is a stopped vehicle such as an obstacle in the lane in which the host vehicle 1 travels, or when the rear vehicle is not present in the case where the lane change is necessary to turn right or left.

In step S100, the path plan generation processing unit 123 determines whether the preceding vehicle is present. This determination can be made typically based on the driving environment information 111 or the driving environment recognition result. For example, the determination can be made based on the detection information of the sensor camera acquired as the driving environment information 111.

After step S100, the process proceeds to step S110.

In step S110 (determination process), the path plan generation processing unit 123 determines whether the offset processing is necessary in the changed lane after the lane change. In the determination above, the path plan generation processing unit 123 determines that the offset processing is necessary when, for example, the size of the preceding vehicle is equal to or larger than a predetermined value. That is, when the preceding vehicle is a large-sized vehicle, the path plan generation processing unit 123 determines that the offset processing is necessary. Here, the size of the preceding vehicle may be acquired as the driving environment information 111 or the traveling environment recognition result, or may be calculated based on information such as the width, height, and shape of the preceding vehicle acquired from the driving environment information 111 or the traveling environment recognition result. Alternatively, the path plan generation processing unit 123 may acquire the driving environment information 111 or the traveling environment recognition result that the type of the preceding vehicle is a large-sized vehicle. In this case, the sensors 200 or the traveling environment recognition processing unit 122 determines whether the preceding vehicle is a large-sized vehicle.

In addition, the path plan generation processing unit 123 may determine that the offset processing is necessary when the preceding vehicle travels to approach or near the changed lane after the lane change. This can be determined based on, for example, that the distance between the preceding vehicle and the reference traveling position 4 in the changed lane after the lane change is equal to or smaller than a threshold value (indicating that the preceding vehicle is traveling near the changed lane after the lane change) or based on that a lateral speed of the preceding vehicle in the lane width direction of the changed lane after the lane change is equal to or greater than a predetermined value (indicating that the preceding vehicle travels to approach the changed lane after the lane change).

Further, the path plan generation processing unit 123 may determine that the offset processing is necessary in the changed lane after the lane change, on condition that the host vehicle 1 overtakes the preceding vehicle in the changed lane after the lane change. In this case, for example, the condition for determining that the offset processing is necessary is satisfied when the set vehicle speed of the host vehicle 1 is higher than the speed of the preceding vehicle or when the lane change is performed in order to overtake the preceding vehicle. With the above, the determination that the offset processing is necessary is not made when the host vehicle 1 does not travel beside the preceding vehicle after the lane change is performed. As a result, it is possible to reduce the cases of unnecessary determination of the offset processing.

When the path plan generation processing unit 123 determines that the offset processing is necessary in the changed lane after the lane change (step S110; Yes), the process proceeds to step S120. When the path plan generation processing unit 123 determines that the offset processing is not necessary in the changed lane after the lane change (step S110; No), the process proceeds to step S130.

In step S120, the path plan generation processing unit 123 generates the path plan 3 (path plan 3*b* in FIG. 3) that is offset in the lane width direction with respect to the reference traveling position 4 in the changed lane after the lane change. After step S120, the process proceeds to step S121.

In step S121, the path plan generation processing unit 123 generates the path plan 3 (path plan 3*a* in FIG. 3) related to the lane change so as to connect to the path plan 3 in the changed lane after the lane change that is generated in step S120. Here, typically, the path plan generation processing unit 123 determines the path shape and the lane change start point in consideration of the speed and turning performance of the host vehicle 1, and generates the path plan 3 related to the lane change.

After step S121, the process ends.

In step S130, the path plan generation processing unit 123 generates the path plan 3 related to the lane change. Typically, the path plan 3 related to the lane change is generated so as to be located at the reference traveling position 4 in the changed lane after the lane change.

After step S130, the process ends.

5. Effect

As described above, in the autonomous driving system 10 and the path plan generation method according to the present embodiment, when the lane change is performed with the preceding vehicle being present, whether the offset processing is necessary in the changed lane after the lane change is determined. When the offset processing in the changed lane after the lane change is determined to be necessary, the path plan 3 that is offset in the lane width direction with respect to the reference traveling position 4 in the changed lane after the lane change is generated. Then, the path plan 3 related to the lane change is generated so as to connect to the offset path plan 3 in the changed lane after the lane change. With the above, even when the lane change is performed, the offset processing is appropriately executed, and the feeling of oppression and anxiety received from the other vehicle 2 that has been the preceding vehicle traveling in the adjacent lane can be reduced. Further, it is possible to suppress the path plan 3 in the changed lane after the lane change from becoming complicated.

Further, overtaking of the preceding vehicle in the changed lane after the lane change may be set to the condition to determine that the offset processing is necessary in the changed lane after the lane change. With the above, it is possible to reduce the cases of unnecessary determination of the offset processing.

What is claimed is:

1. An autonomous driving system that causes a vehicle to autonomously travel along a path plan, the autonomous driving system comprising:

at least one memory that stores driving environment information of the vehicle, the driving environment information including a traveling state and position information of a preceding vehicle currently traveling in front of the vehicle and a rear vehicle currently traveling behind the vehicle, the traveling state including one or more of a speed of the vehicle, an acceleration of the vehicle, or a yaw rate of the vehicle; and at least one processor coupled with the at least one memory, wherein the at least one processor is configured to execute, based on the driving environment information:

a determination process of determining whether offset processing is necessary, the offset processing offsetting the path plan in a lane width direction with respect to a reference traveling position in a changed lane after a lane change when the lane change is performed in response to the preceding vehicle being present, and determining that the lane change is performed when the rear vehicle is not present in a case where the lane change is necessary to turn right or left, a process of generating the path plan related to the lane change based on determining a path shape and a lane change start point in consideration of the speed and turning performance of the vehicle, so as to connect to the path plan that is offset in the changed lane after the lane change when the offset processing is necessary, a process of generating and outputting a control signal that causes the vehicle to travel in accordance with the path plan, and a process of determining that the offset processing is necessary when the preceding vehicle travels to approach the changed lane after the lane change based on a lateral speed of the preceding vehicle in the lane width direction of the changed lane after the lane change is equal to or greater than a first predetermined value indicating that the preceding vehicle travels to approach the changed lane after the lane change.

2. The autonomous driving system according to claim 1, wherein the at least one processor determines that, in the determination process, the offset processing is necessary when a size of the preceding vehicle is equal to or greater than a second predetermined value.

3. The autonomous driving system according to claim 2, wherein the at least one processor determines that, in the determination process, the offset processing is necessary further on condition that the vehicle overtakes the preceding vehicle in the changed lane after the lane change.

4. The autonomous driving system according to claim 1, wherein the at least one processor executes traveling environment recognition including recognition of white road lines, and a size and a type of the preceding vehicle; and wherein the path plan is generated based on a result of executing the traveling environment recognition.

5. A path plan generation method that generates a path plan related to autonomous driving of a vehicle, the path plan generation method comprising:

a storing process of storing driving environment information of the vehicle, the driving environment information including a traveling state and position information of a preceding vehicle currently traveling in front of the vehicle and a rear vehicle currently traveling behind the vehicle, the traveling state including one or more of a speed of the vehicle, an acceleration of the vehicle, or a yaw rate of the vehicle;

a determination process of determining whether offset processing is necessary, the offset processing offsetting the path plan in a lane width direction with respect to a reference traveling position in a changed lane after a lane change when the lane change of the vehicle is performed in response to the preceding vehicle being present, and determining that the lane change is performed when the rear vehicle is not present in a case where the lane change is necessary to turn right or left;

a process of generating the path plan related to the lane change based on determining a path shape and a lane change start point in consideration of the speed and turning performance of the vehicle, so as to connect to the path plan that is offset in the changed lane after the lane change;

a process of generating and outputting a control signal that causes the vehicle to travel in accordance with the path plan; and a process of determining that the offset processing is necessary when the preceding vehicle travels to approach the changed lane after the lane change based on a lateral speed of the preceding vehicle in the lane width direction of the changed lane after the lane change is equal to or greater than a first predetermined value indicating that the preceding vehicle travels to approach the changed lane after the lane change.

6. The path plan generation method according to claim 5, wherein in the determination process, a size of the preceding vehicle is acquired or calculated, and the offset processing is determined to be necessary when the size is equal to or greater than a second predetermined value.

7. The path plan generation method according to claim 6, wherein in the determination process, the offset processing is determined to be necessary further on condition that the vehicle overtakes the preceding vehicle in the changed lane after the lane change.

8. A non-transitory storage medium storing a program that causes a computer to execute the path plan generation method according to claim 5.

* * * * *